(12) United States Patent
Nagano

(10) Patent No.: US 8,699,526 B2
(45) Date of Patent: Apr. 15, 2014

(54) COMMUNICATION CONTROL METHOD AND TRANSMITTING APPARATUS

(75) Inventor: Toshio Nagano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 687 days.

(21) Appl. No.: 12/581,396

(22) Filed: Oct. 19, 2009

(65) Prior Publication Data
US 2010/0128743 A1 May 27, 2010

(30) Foreign Application Priority Data
Nov. 27, 2008 (JP) ................................. 2008-302168

(51) Int. Cl.
*H04J 3/24* (2006.01)
(52) U.S. Cl.
USPC ............ 370/475; 370/399; 370/474; 709/224
(58) Field of Classification Search
USPC ........................................................ 370/475
See application file for complete search history.

(56) References Cited

U.S. PATENT DOCUMENTS

| 7,515,605 B2 * | 4/2009 | Harel et al. .................. 370/466 |
| 2004/0052263 A1 * | 3/2004 | Xu ................................. 370/399 |
| 2004/0167978 A1 | 8/2004 | Kitayama |

FOREIGN PATENT DOCUMENTS

| JP | 10-271167 | 10/1998 |
| JP | 2004-207878 | 7/2004 |

\* cited by examiner

*Primary Examiner* — David Oveissi
(74) *Attorney, Agent, or Firm* — Staas & Halsey LLP

(57) ABSTRACT

A communication control method of a transmission system that exchanges a transmission frame between a first transmitting apparatus and a second transmitting apparatus, the communication control method including causing the first transmitting apparatus to receive a transmission frame, which is encapsulated using a first method or a second method different from the first method, from the second transmitting apparatus; causing the first transmitting apparatus to determine an encapsulation method of the transmission frame, based on information set according to the encapsulation method in the received transmission frame; causing the first transmitting apparatus to decapsulate the received transmission frame, based on the determination result; and causing the first transmitting apparatus to encapsulate another transmission frame using the determined encapsulation method and transmit another transmission frame.

8 Claims, 11 Drawing Sheets

*FIG. 6*

| RECEIVING PATH | STS-POH | VT-POH | | CORRESPONDING ENCAPSULATION METHOD |
|---|---|---|---|---|
| | C2 BYTE | V5 BYTE | Z7 BYTE | |
| STS PATH | 0x16 | — | — | PPP |
| STS PATH | 0x1B | — | — | GFP |
| VT PATH | 0x02 | 0x05 | 0x0A | PPP |
| VT PATH | 0x02 | 0x05 | 0x0D | GFP |

COMMUNICATION CONTROL METHOD AND TRANSMITTING APPARATUS

CROSS-REFERENCE TO RELATED APPLICATIONS

This application is based upon and claims the benefit of priority of the prior Japanese Patent Application No. 2008-302168, filed on Nov. 27, 2008, the entire contents of which are incorporated herein by reference.

BACKGROUND

1. Field

The embodiments discussed herein are related to a communication control method and a transmitting apparatus, which are used in a communication network that converts a transmission format of a data signal and performs communication.

2. Description of the Related Art

A Synchronous Optical NETwork (SONET) (also referred to as a Synchronous Digital Hierarchy (SDH)) has been used as a network interface for realizing Broadband Aspects of Integrated Services Digital Network (B-ISDN).

In a communication network of the SONET or SDH (hereinafter, referred to as SONET/SDH) system, a data signal is transmitted using a data frame (transmission frame) having an overhead portion and a payload portion. The overhead portion has a pointer, for example, that indicates a relative position of a head of a payload (data body) accommodated in the payload portion. As a result, the transmission frame can accommodate the payload using an arbitrary position of the payload portion as the head.

As an existing technique that is related to the SONET/SDH, a method has been known that allows a communication apparatus to monitor reception states of flags sequentially arriving at a predetermined interval through a link fixed between the communication apparatus and a facing apparatus, and determine whether the link is normal or abnormal, thereby quickly determining a link state.

In addition, a method has been known that encrypts data of a transmission packet, encapsulates data including the encrypted data, and transmits the packet, thereby securing a security with a host at the time of communication.

Japanese Patent Application Laid-Open No. 2004-207878 and Japanese Patent Application Laid-Open No. 10-271167 disclose related techniques.

There is a communication network that transmits IP packets between Internet protocol (IP) networks through the communication network of the SONET/SDH system.

For example, in the IP network, IP packets are transmitted with a transmission format using a data frame having a variable length. In addition, in the communication network of the SONET/SDH system, a data signal is transmitted with a transmission format using a continuous byte sequence.

That is, since the transmission format used in the communication network of the SONET/SDH system is different from the transmission format of the IP packet, the IP packet cannot be transmitted as it is in the communication network of the SONET/SDH system.

Accordingly, for example, frames having a variable length are converted (encapsulated) into a continuous byte sequence and transmitted in a SONET/SDH transmitting apparatus at the transmitting side of IP packets, and the frames are decapsulated and the IP packets are extracted in a SONET/SDH transmitting apparatus at the receiving side of the IP packets.

However, during an encapsulating process, a plurality of methods is used. For this reason, if recognitions of encapsulation methods are mismatched in the IP packet transmitting side and the IP packet receiving side, the received transmission data cannot be normally decapsulated at the IP packet receiving side. As a result, transmission efficiency of the communication network may be lowered.

SUMMARY

According to an aspect of the invention, a communication control method of a transmission system that exchanges a transmission frame between a first transmitting apparatus and a second transmitting apparatus, the communication control method including causing the first transmitting apparatus to receive a transmission frame, which is encapsulated using a first method or a second method different from the first method, from the second transmitting apparatus; causing the first transmitting apparatus to determine an encapsulation method of the transmission frame, based on information set according to the encapsulation method in the received transmission frame; causing the first transmitting apparatus to decapsulate the received transmission frame, based on the determination result; and causing the first transmitting apparatus to encapsulate another transmission frame using the determined encapsulation method and transmit another transmission frame.

According to another aspect of the invention, a transmitting apparatus exchanges a transmission frame with another transmitting apparatus, the transmitting apparatus including a receiver configured to receive a transmission frame, which is encapsulated using a first method or a second method different from the first method, from the another transmitting apparatus; a determiner configured to determine an encapsulation method of the transmission frame received by the receiver, based on information set according to the encapsulation method in the received transmission frame; a decapsulating unit configured to decapsulate the transmission frame received by the receiver, based on the determination result of the determiner; and a transmitter configured to encapsulate another transmission frame using the encapsulation method determined by the determiner and transmit another transmission frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 6 is a diagram illustrating a correspondence relationship between a C2 byte or a Z7 byte and an encapsulation method;

DETAILED DESCRIPTION OF THE PREFERRED EMBODIMENTS

Figure 1:
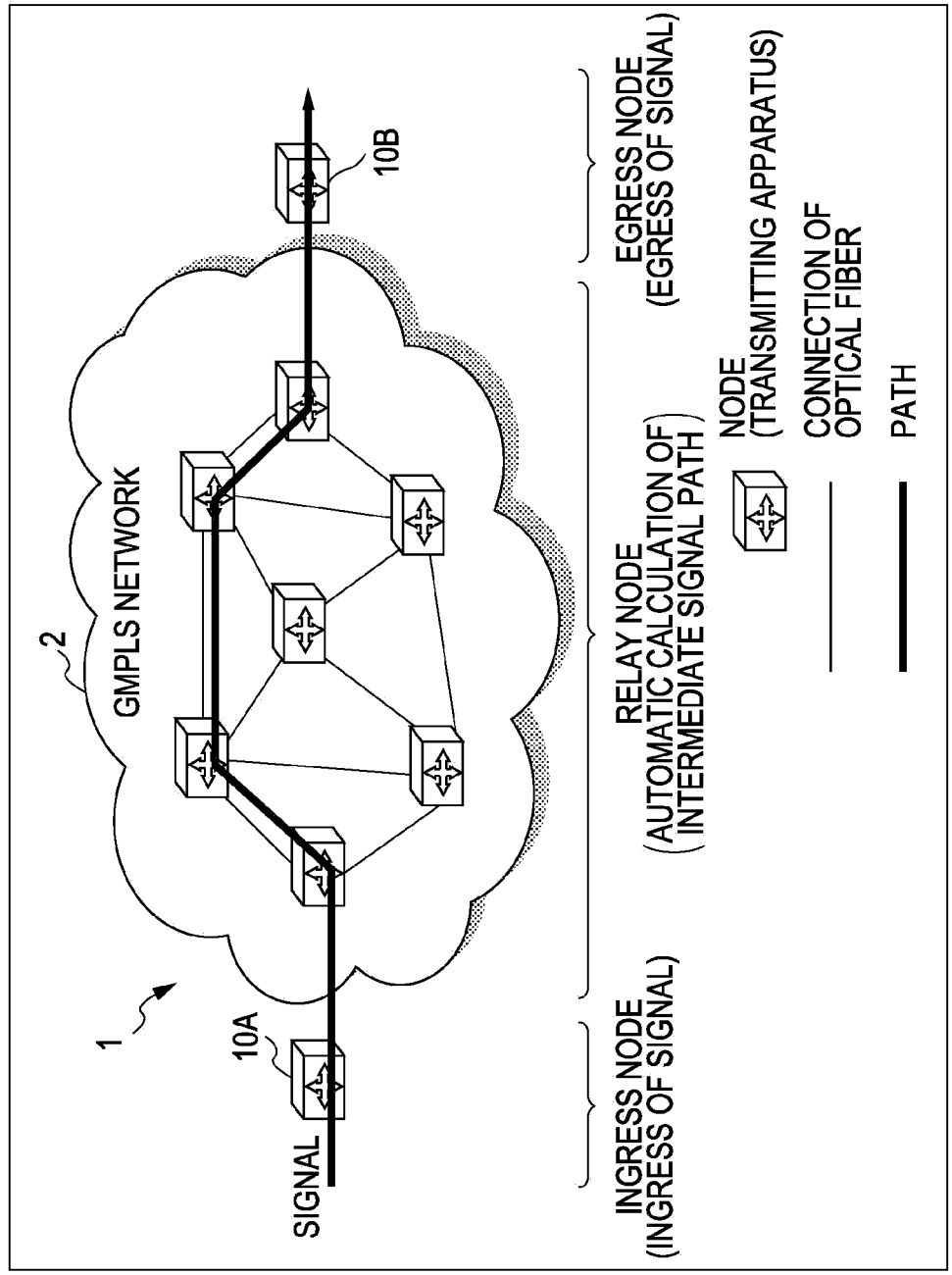
FIG. 1 is a diagram illustrating an example of the configuration of a communication network according to an embodiment.

Reference may now be made in detail to embodiments of the present invention, examples of which are illustrated in the accompanying drawings, wherein like reference numerals refer to like elements throughout.

Hereinafter, embodiments will be described with reference to the accompanying drawings. However, the embodiments described below are only exemplary, and it is not intended that various modifications or applications of techniques not disclosed in the embodiments below are excluded. That is, various modifications of the embodiments (combinations of the embodiments and the like) can be embodied without departing from the sprit and scope of the present invention.

(1. Embodiment)

FIG. 1 is a diagram illustrating an example of the configuration of a communication network according to an embodiment.

A communication network 1 illustrated in FIG. 1 includes an ingress node 10A, a Generalized Multi-Protocol Label Switching (GMPLS) network 2, and an egress node 10B. The ingress node 10A can convert a transmission format of an IP packet and transmit the IP packet to the egress node 10B or receive a transmission frame from the egress node 10B. The GMPLS network 2 exemplified in FIG. 1 is, for example, a communication network of a SONET/SDH system, and has a plurality of relay nodes that are connected by an optical fiber. Further, the GMPLS network 2 can freely set a data transmission path between the relay nodes. In the example illustrated in FIG. 1, a transmission frame transmitted from the ingress node 10A is transmitted to the egress node 10B through a path indicated by a thick line in FIG. 1. The egress node 10B can recover the transmission format of the transmission frame received from the ingress node 10A and extract the IP packet, or convert the transmission format of the IP packet and transmit the IP packet to the ingress node 10A.

In this embodiment, the description is given using the IP packet as an example of the packet. However, data where a header portion including a destination is added to a data portion can be used as a packet. In this embodiment, the description is given using a SONET/SDH transmission frame as an example of the transmission frame. However, data where a header portion is added to a packet or control data can be used as the transmission frame. In the description below, each SONET/SDH transmission frame may be simply referred to as a SONET transmission frame. However, the SDH transmission frame can be used as a transmission frame.

Further, when the ingress node 10A and the egress node 10B are not discriminated from each other, the ingress node and the egress node are generically called a transmitting apparatus (or node) 10.

Figure 2:
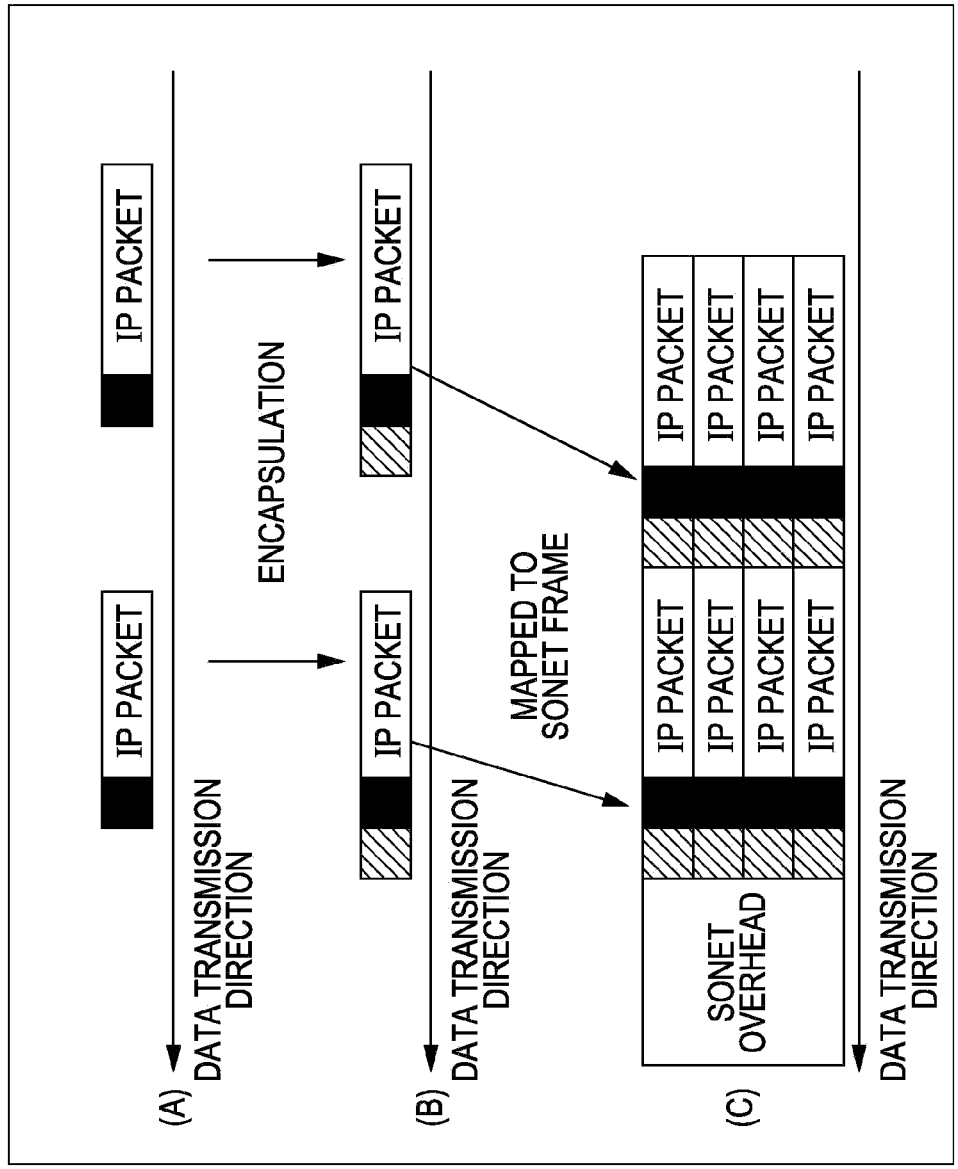
FIG. 2 is a diagram illustrating an example of a converting process of a transmission format.

Next, a converting process of the transmission format will be described using FIG. 2.

The ingress node 10A receives an IP packet having an IP data portion (white portion of FIG. 2(A)) and an IP header portion (black potion of FIG. 2(A)), from an IP network (not illustrated) (refer to FIG. 2(A)).

The ingress node 10A performs an encapsulating process that adds an overhead (hatched portion of FIG. 2(B)) for encapsulation to the IP packet received from the IP network (refer to FIG. 2(B)).

At this time, as methods of the encapsulating process, two methods are generally used. One is a Point-to-Point protocol (PPP) and the other is a Generic Framing Procedure (GFP).

The PPP is a protocol that is defined by RFC 1661 of the Internet Engineering Task Force (IETF). The GFP is a protocol that is recommended by G.7041 of the International Telecommunication Union Telecommunication Standardization Sector (ITU-T). The GFP has length information of an IP packet. The encapsulation using the GFP is more preferable because the IP packet can be efficiently accommodated in the SONET transmission frame.

The ingress node 10A according to this embodiment can encapsulate the IP packet using any one of the above-described methods.

The encapsulated IP packet (hereinafter, referred to also as data frame) is mapped to a transmission frame by the ingress node 10A. Further, the SONET overhead is added to a head of the transmission frame, and the transmission frame is transmitted as a SONET transmission frame to the GMPLS network 2 (refer to FIG. 2(C)).

In FIG. 1, the SONET transmission frame that is transmitted from the ingress node 10A is transmitted to the egress node 10B through a predetermined path of the GMPLS network 2.

The egress node 10B can extract the encapsulated data frame from the SONET transmission frame, decapsulate the data frame using a decapsulation method previously set for a network manager, and extract the IP packet.

Accordingly, when the decapsulation method set to the egress node 10B is different from the encapsulation method in the ingress node 10A, the IP packet cannot be normally extracted.

Further, when the transmitting side and the receiving side of the IP packet are distant from each other, it is very difficult to recognize each encapsulation method and each decapsulation method. For this reason, it is not possible for a network constructor to manage and operate an encapsulation method and a decapsulation method at the transmitting and receiving sides of the IP packet.

Figure 3:
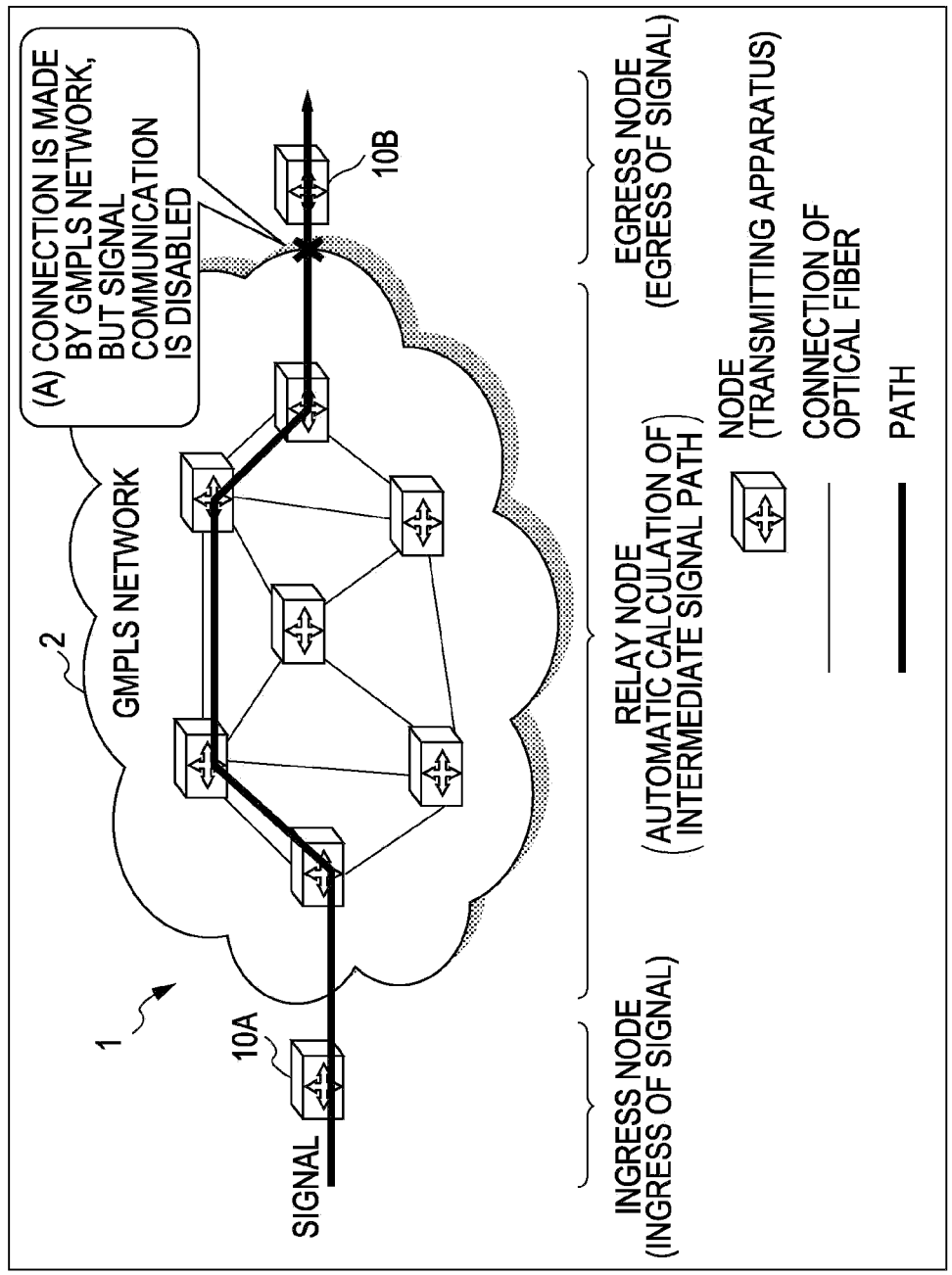
FIG. 3 is a diagram illustrating an example of a communication process of when decapsulation cannot be performed.

Further, in the GMPLS network 2, connection setting of a path can be freely performed, but communication of a transmitted signal through the path cannot be ensured (refer to A in FIG. 3).

Accordingly, in this embodiment, the transmission frame that is encapsulated using the PPP or GFP in the ingress node (second transmitting apparatus) 10A is received by the egress node (first transmitting apparatus) 10B. Then, the egress node (first transmitting apparatus) 10B determines the encapsulation method based on information set to the SONET transmission frame according to the encapsulation method, and decapsulates the received SONET transmission frame based on the determination result. Further, the egress node 10B encapsulates the SONET transmission frame to be transmitted to another node (for example, ingress node 10A) using the determined encapsulation method, and transmits the encapsulated SONET transmission frame.

Thereby, the transmission frame can be decapsulated by matching the encapsulation method and the decapsulation method at the transmitting side and the receiving side. As a result, transmission efficiency of the communication network can be improved.

For example, since a network manager may not manage and set the encapsulation method and the decapsulation method at the transmitting side and the receiving side, a procedure until signal communication in the communication network can be simplified, and an operation load of the communication network can be alleviated.

(1.1 Transmitting apparatus 10)

Figure 4:
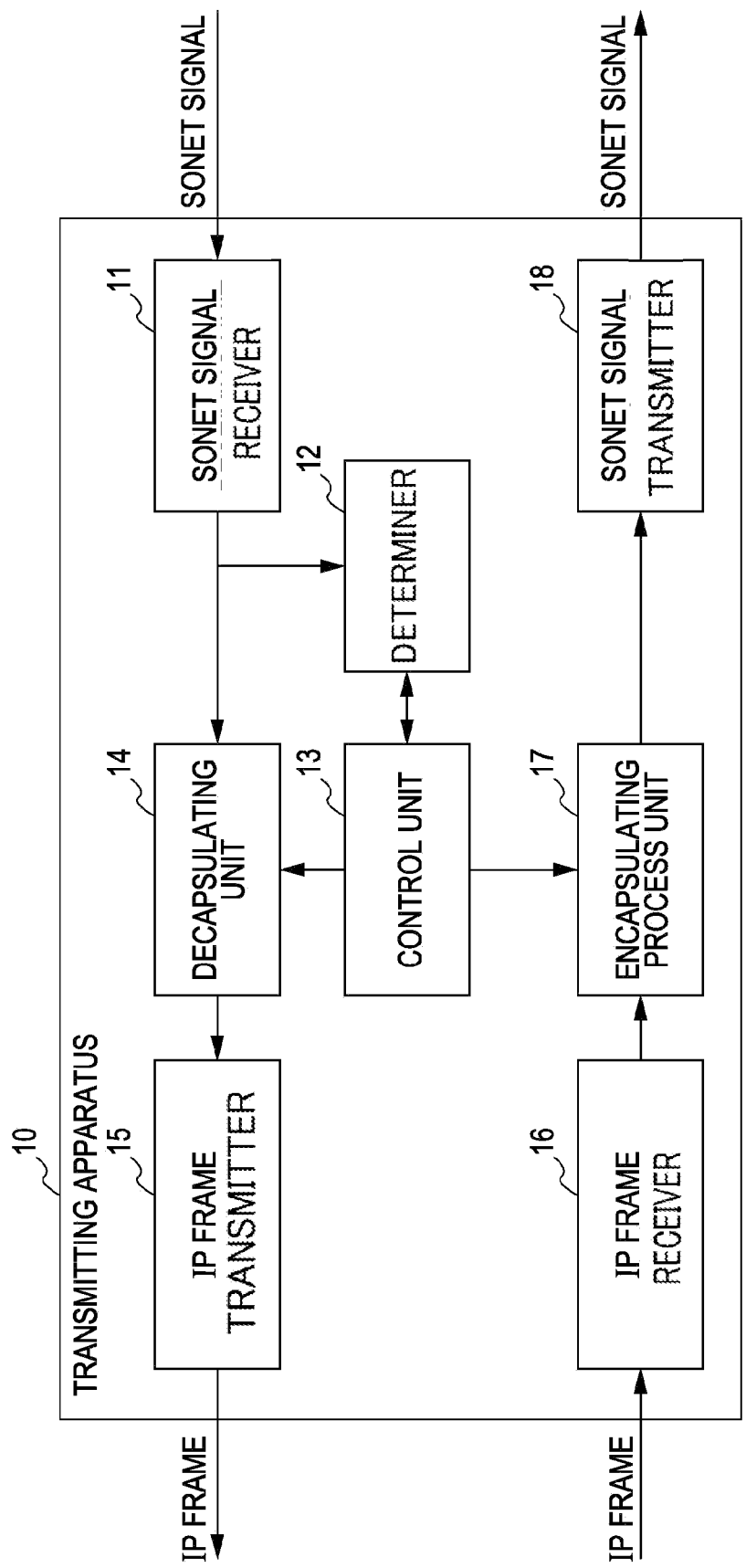
FIG. 4 is a block diagram illustrating an example of the configuration of a transmitting apparatus illustrated in FIG. 1.

FIG. 4 is a block diagram illustrating an example of the configuration of the transmitting apparatus 10 according to an embodiment. The transmitting apparatus 10 illustrated in FIG. 4 includes a SONET signal receiver 11, a determiner 12, a control unit 13, a decapsulating unit 14, and an IP frame transmitter 15. The transmitting apparatus 10 further includes an IP frame receiver 16, an encapsulating process unit 17, and a SONET signal transmitter 18.

In this case, the SONET signal receiver 11 receives a SONET transmission frame from the transmitting side 10A (or 10B). For example, the SONET signal receiver 11 can extract the encapsulated data frame from the received SONET transmission frame.

That is, the SONET signal receiver 11 according to this embodiment functions as an example of a receiver that receives a data frame encapsulated using the PPP or GFP from the transmitting side 10A (or 10B).

The determiner 12 determines the encapsulation method of the data frame based on information in a SONET overhead set to the SONET transmission frame.

Figure 5:
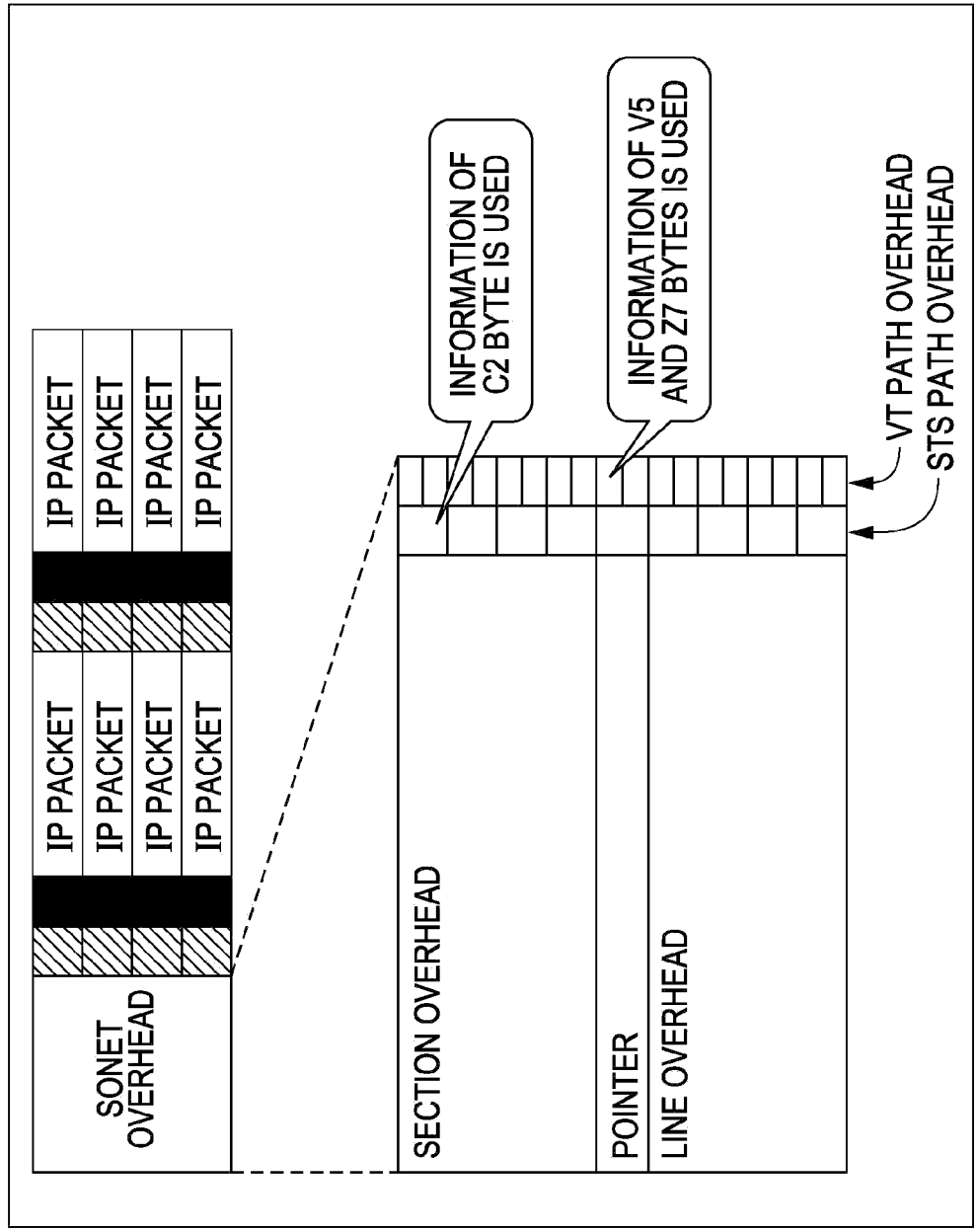
FIG. 5 is a diagram illustrating an example of a SONET overhead.

Next, the SONET overhead in the SONET transmission frame will be described using FIG. 5. As exemplified in FIG. 5, the SONET overhead has a section overhead, a pointer, and a line overhead. A section overhead region is a region that stores operation information to manage and maintain a state of a transmission section. The pointer is information that indicates a relative position of a head of a payload (data body) accommodated in a payload portion. The line overhead is a type of Transport Overhead (TOH) used in the SONET.

Further, the SONET overhead has a Synchronous Transport Signal-Path Overhead (STS-POH) and a Virtual Tributary-Path Overhead (VT-POH). The determiner 12 according to this embodiment can determine the encapsulation method, based on a C2 byte value stored in the STS-POH or a Z7 byte value stored in the VT-POH. The C2 byte, the V5 byte, and the Z7 byte indicate an STS Path Signal Label, a VT Path Signal Label, and an Extended VT Path Signal Label, respectively.

As exemplified in FIG. 6, when a path (receiving path) that has received the SONET transmission frame is the STS path, if the encapsulation method of the data frame is the PPP, "0x16" is set to the C2 byte of the STS-POH. Further, if the encapsulation method of the data frame is the GFP, "0x1 B" is set to the C2 byte of the STS-POH.

Meanwhile, when the path (receiving path) that has received the SONET transmission frame is the VT path, if the encapsulation method of the data frame is the PPP, "0x0A" is set to the Z7 byte of the VT-POH. Further, if the encapsulation method of the data frame is the GFP, "0x0D" is set to the C2 byte of the STS-POH. These set values are defined by Telcordia GR-253-CORE of North America.

Thereby, the determiner 12 (referring again to FIG. 4) according to this embodiment can determine the encapsulation method of the data frame, based on the C2 byte value or the Z7 byte value set to the SONET overhead of the SONET transmission frame by the transmitting-side apparatus.

The control unit 13 controls the decapsulating unit 14 and the encapsulating process unit 17, based on the determination result of the determiner 12. For example, when the determination result of the determiner 12 is different from the encapsulation and decapsulation methods executed by the control unit 13, the encapsulation and decapsulation methods are changed.

Further, the control unit 13 according to this embodiment includes a timer, and can perform a change of the encapsulation method in the encapsulating process unit 17 after a passage of time according to the determination result of the determiner 12. At this time, the long time can be set in the case where the determination result is the PPP rather than the case where the determination result is the GFP. For example, when the determination result is the PPP, the encapsulation method in the encapsulating process unit 17 may be changed after a passage of 10 seconds from the determination. Meanwhile, when the determination result is the GFP, the encapsulation method in the encapsulating process unit 17 may be changed after a passage of 5 seconds from the determination.

In this way, when communication of the SONET transmission frame is performed between the transmitting apparatus 10 and another transmitting apparatus 10 facing the transmitting apparatus 10, the encapsulation methods can be standardized to one encapsulation method. Since data transmission efficiency is generally superior in the case of using the GFP rather than the case of using the PPP, the timer setting time of when the determination result is the PPP is longer than the timer setting time of when the determination result is the GFP, such that the encapsulation methods are standardized to the GFP.

Further, the timer may start a time measurement using reception of the SONET transmission frame in the SONET signal receiver 11 as a trigger. In this case, a timer set value that considers a transmission delay in the transmitting apparatus 10 and time needed to switch the encapsulation method by the control unit 13 can be used.

The decapsulating unit 14 decapsulates the received data frame using the decapsulation method set by the control unit 13. Then, the decapsulating unit 14 transmits an IP packet (IP frame), which is extracted by decapsulating the data frame, to the IP frame transmitter 15.

That is, the decapsulating unit 14 according to this embodiment functions as an example of a decapsulating unit that decapsulates the SONET transmission frame, based on the determination result of the encapsulation method by the determiner 12.

The IP frame transmitter 15 transmits the IP frame, which is extracted by the decapsulating unit 14, to the IP network (not illustrated).

The IP frame receiver 16 receives an IP frame from the IP network. The received IP frame is transmitted to the encapsulating process unit 17.

The encapsulating process unit 17 adds a predetermined overhead for encapsulation to the IP frame received from the IP frame receiver 16, using the encapsulation method set by the control unit 13, and executes an encapsulating process. The encapsulated data frame is transmitted to the SONET signal transmitter 18.

The SONET signal transmitter 18 maps the data frame, which is received from the encapsulating process unit 17, to a transmission frame, adds a SONET overhead, and generates a SONET transmission frame. At this time, in the added SONET overhead, information (C2 byte value or Z7 byte value) according to the encapsulation method in the encapsulating process unit 17 is set. Then, the SONET transmission frame that is generated by the SONET signal transmitter 18 is transmitted to the transmitting side 10A (or 10B).

That is, the SONET signal transmitter 18 according to this embodiment functions as an example of a transmitter that encapsulates a transmission frame transmitted to another node (for example, facing node 10A (or 10B)) using the encapsulation method determined by the determiner 12 and transmits the transmission frame.

(1.2 Operation Example of a Transmitting Apparatus 10)

Next, an example of the operation of the transmitting apparatus 10 will be described using FIG. 7.

Figure 7:
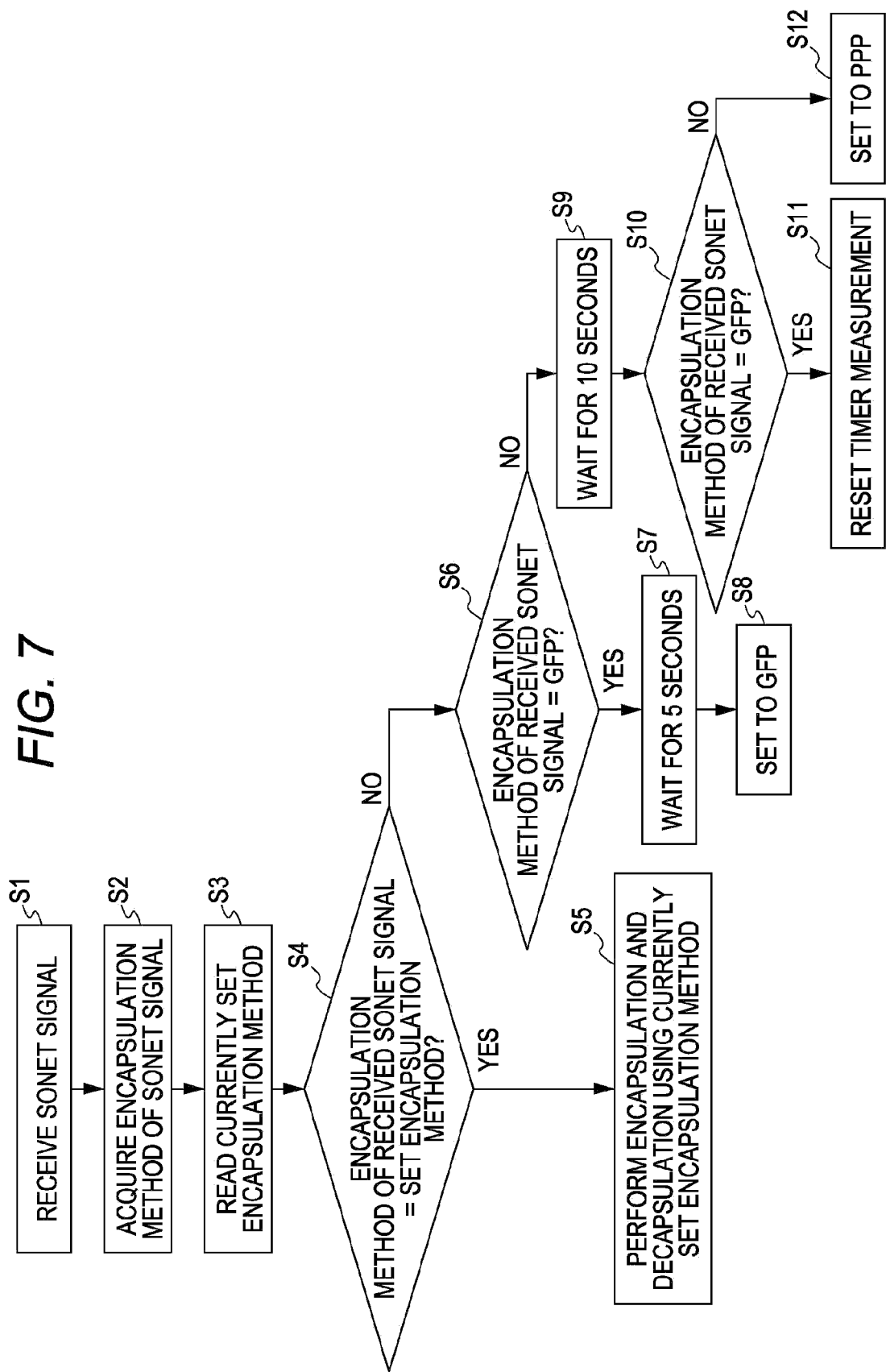
FIG. 7 is a flowchart illustrating an example of the operation of the transmitting apparatus illustrated in FIG. 4.

First, as exemplified in FIG. 7, the SONET signal receiver 11 receives a SONET transmission frame transmitted from a facing station 10A (or 10B) (operation S1).

Then, the determiner 12 acquires (determines) the encapsulation method of the received data frame, based on a value of the C2 byte or the Z7 byte set to the SONET overhead of the SONET transmission frame (operation S2).

The control unit 13 reads the encapsulation method and the decapsulation method that are currently used in the transmitting apparatus 10 (operation S3). Then, the control unit 13 determines whether the encapsulation method and the decapsulation method read in operation S3 is matched with the encapsulation method acquired in operation S2 (operation S4).

When it is determined that the encapsulation method read in operation S3 is matched with the encapsulation method acquired in operation S2 (YES of operation S4), the control unit 13 performs encapsulation and decapsulation according to the methods that are currently used(operation S5). That is, since this case corresponds to the case where the encapsulation methods are matched in the own station 10 and the facing station 10A (or 10B), the encapsulation method may not be changed.

Figure 8:
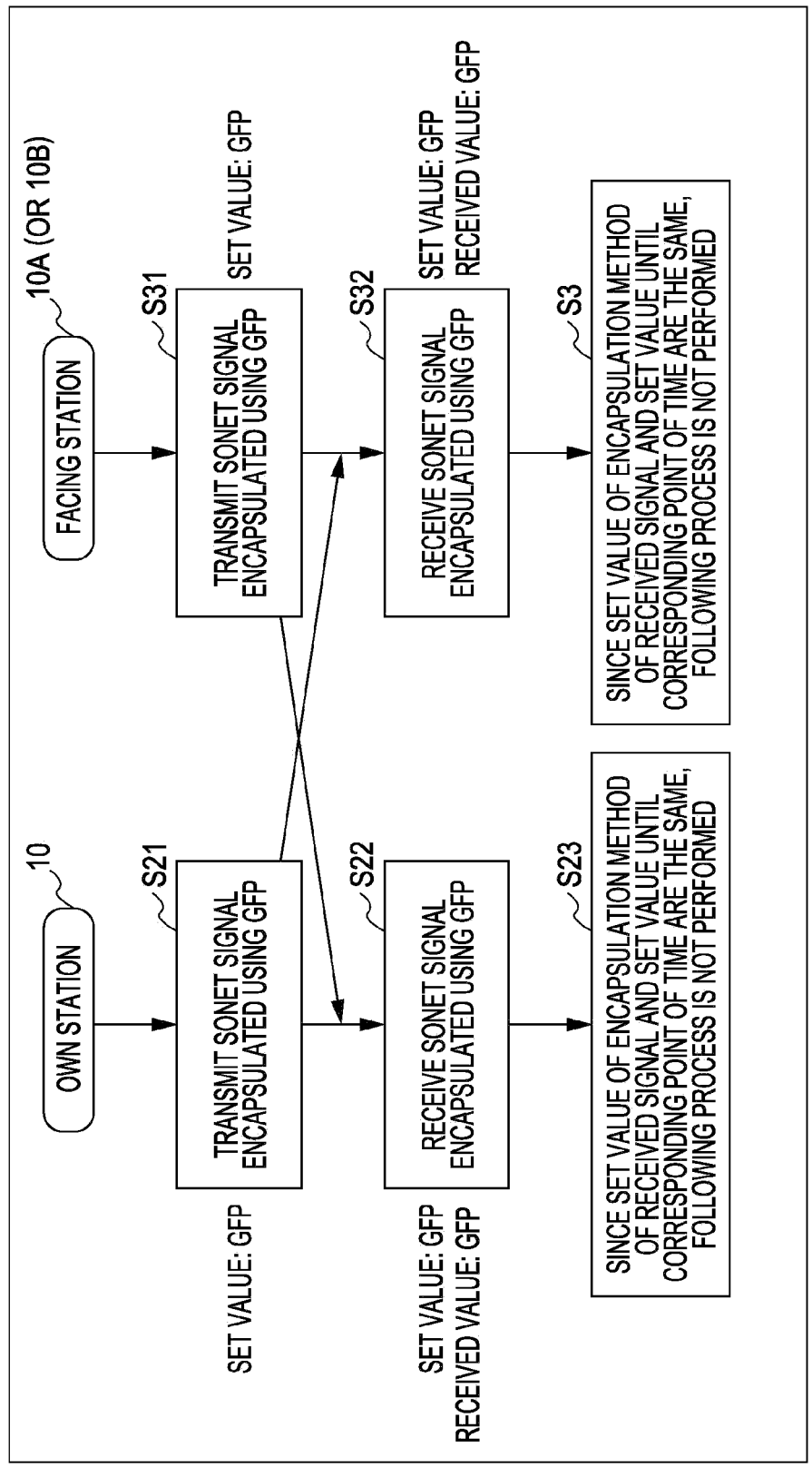
FIG. 8 is a flowchart illustrating an example of the communication operation between the transmitting apparatuses illustrated in FIG. 4.

An operation example of the above case is exemplified in FIG. 8.

For example, when the encapsulation methods in the own station 10 and the facing station 10A (or 10B) are matched as the GFP, the SONET transmission frames that are encapsulated using the GFP are transmitted by the own station 10 and the facing station 10A (or 10B) (operations S21 and S31).

Each of the own station 10 and the facing station 10A (or 10B) receives the SONET transmission frame, which is encapsulated using the GFP, from the facing side (operations S22 and S32), and determines the encapsulation method of the received data frame, based on information of the SONET overhead.

Next, the own station 10 and the facing station 10A (or 10B) determine whether the determined encapsulation method of the received data frame and the encapsulation method set by the control unit 13 are matched with each other.

In the example illustrated in FIG. 8, in the own station 10 and the facing station 10A (or 10B), since the encapsulation method of the received data frame and the encapsulation method set by the control unit 13 are matched with each other, the encapsulation method is not changed (following operation is not performed) (operations S23 and S33).

Referring back to FIG. 7, when it is determined that the encapsulation method read in operation S3 and the encapsulation method acquired in operation S2 are different from each other (NO of operation S4), the control unit 13 changes the encapsulation method and the decapsulation method. That is, since this case corresponds to the case where the encapsulation methods are mismatched in the own station 10 and the facing station 10A (or 10B), the encapsulation method is changed (the following operation is performed).

However, each of the own station 10 and the facing station 10A (or 10B) may change the encapsulation method according to the encapsulation method of the received SONET transmission frame. In this case, the encapsulation method may be changed each time the SONET transmission frame is received, and the encapsulation methods may not be standardized between the own station 10 and the facing station 10A (or 10B).

Accordingly, as described below, the operation of efficiently standardizing the encapsulation method may be performed. In the description below, the encapsulation method is standardized to the GFP, which has superior transmission efficiency as compared to the PPP.

When it is determined that the encapsulation method read in operation S3 and the encapsulation method acquired in operation S2 are different from each other (NO of operation S4), the control unit 13 determines whether the encapsulation method of the received SONET transmission frame is the GFP (operation S6).

When it is determined that the encapsulation method of the received SONET transmission frame is the GFP (YES of operation S6), the control unit 13 uses the timer function to maintain a waiting state for 5 seconds after the determination in operation S6 (operation S7). When the data frames encapsulated using the GFP are continuously received during the waiting state, the control unit 13 changes the encapsulation method to the GFP (operation S8). When the data frame encapsulated using the PPP is received during the clocking, the control unit 13 may reset the timer and return the process to operation S1.

Meanwhile, when it is determined that the encapsulation method of the received SONET transmission frame is not the GFP (that is, the PPP) (NO of operation S6), the control unit 13 uses the timer function to maintain a waiting state for 10 seconds after the determination in operation S6 (operation S9). Then, the control unit 13 determines whether the encapsulation method of the SONET transmission frame received after a passage of 10 seconds (or during the timer measurement) is the GFP (operation S10).

When it is determined that the encapsulation method of the SONET transmission frame received after the passage of 10 seconds (or during the timer measurement) is the GFP (YES of operation S10), the control unit 13 resets the timer measurement (operation 511).

Meanwhile, when it is determined that the encapsulation method of the SONET transmission frame received after the passage of 10 seconds (or during the timer measurement) is the PPP (NO of operation S10), the control unit 13 changes the encapsulation method to the PPP (operation S12).

As described above, a time difference is set until the encapsulation method is changed, in accordance with the encapsulation method of the received SONET transmission frame, so that the change of the encapsulation method in the own station 10 can be informed to the facing station 10A (or 10B). As a result, the encapsulation method can be standardized. Further, if the timer set value of when the encapsulation method of the received data frame is the PPP is set to be larger than the timer set value of when the encapsulation method of the received data frame is the GFP, the encapsulation method can be standardized to the GFP.

Figure 9:
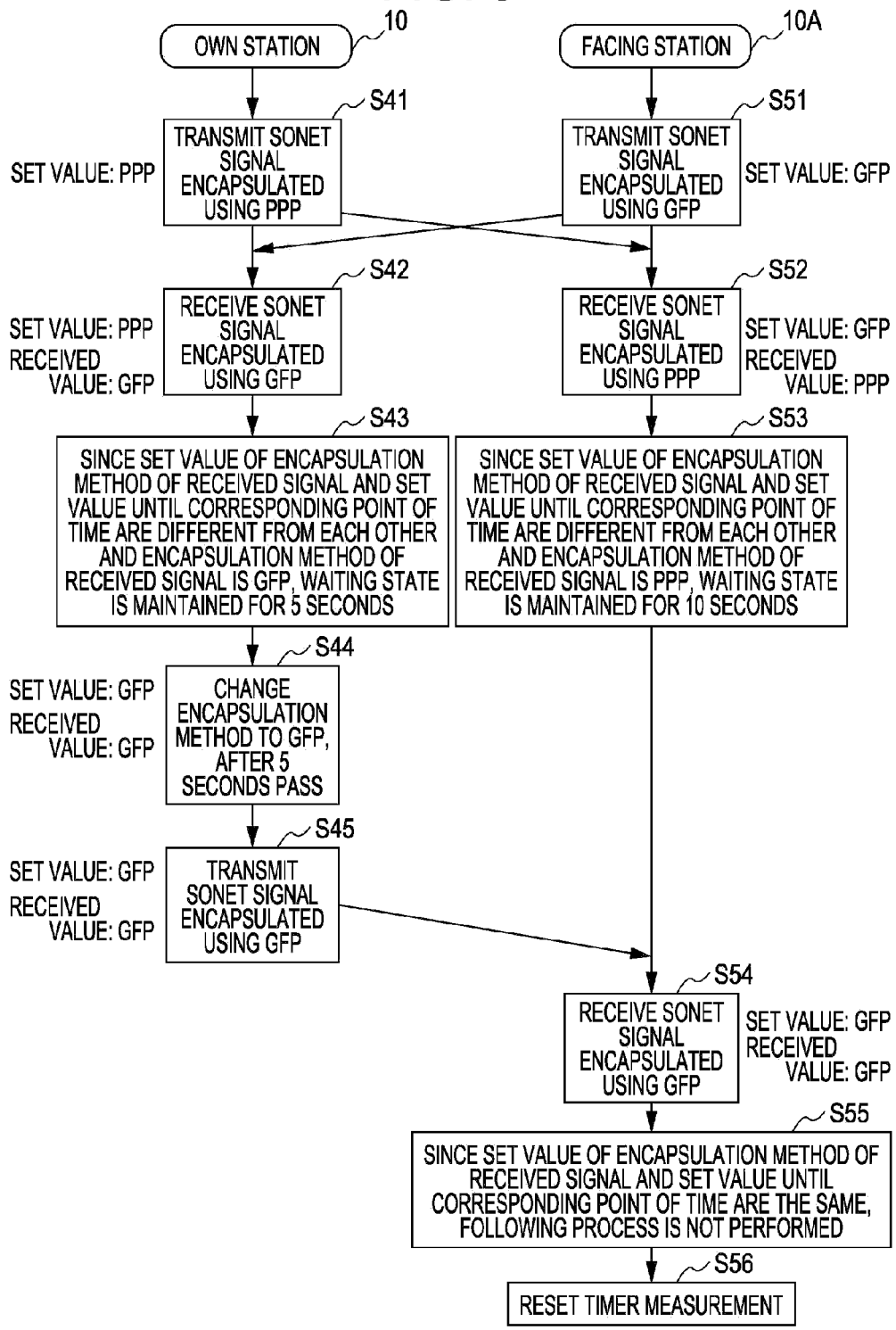
FIG. 9 is a flowchart illustrating an example of the communication operation between the transmitting apparatuses illustrated in FIG. 4.

An operation example of the above case is exemplified in FIG. 9.

For example, when the set value of the encapsulation method in the own station 10 is the PPP and the set value of the encapsulation method in the facing station 10A (or 10B) is the GFP, the own station 10 transmits the SONET transmission frame, which is encapsulated using the PPP, to the facing station 10A (or 10B) (operation S41). Meanwhile, the facing station 10A (or 10B) transmits the SONET transmission frame, which is encapsulated using the GFP, to the own station 10 (operation S51).

For this reason, at the side of the own station 10, the SONET transmission frame that is encapsulated using the GFP is received (operation S42). However, at the side of the facing station 10A (or 10B), the SONET transmission frame that is encapsulated using the PPP is received (operation S52).

Then, each of the own station 10 and the facing station 10A (or 10B) determines the encapsulation method of the received data frame, based on information (C2 byte value or Z7 byte value) of the SONET overhead of the received SONET transmission frame.

At this time, at the side of the own station 10, it is determined that the encapsulation method of the received data frame is the GFP and is different from the set value of the encapsulation method of the control unit 13. For this reason, the control unit 13 at the side of the own station 10 maintains a waiting state for 5 seconds after the determination (operation S43)

Meanwhile, at the side of the facing station 10A (or 10B), it is determined that the encapsulation method of the received data frame is the PPP and is different from the set value of the encapsulation method of the control unit 13. For this reason, the control unit 13 at the side of the facing station 10A (or 10B) maintains a waiting state for 10 seconds after the determination (operation S53).

When 5 seconds pass, the own station 10 changes the set value of the control unit 13 from the PPP to the GFP (operation S44).

Thereby, from the side of the own station 10, the SONET transmission frame that is encapsulated using the GFP is transmitted to the side of the facing station 10A (or 10B) (operation S45).

In this case, the facing station 10A (or 10B) receives the SONET transmission frame, which is encapsulated using the GFP, from the side of the own station 10 (operation S54), and determines the encapsulation method of the received data frame, based on the information of the SONET overhead of the received SONET transmission frame.

At this time, at the side of the facing station 10A (or 10B), it is determined that the encapsulation method of the received data frame is the GFP and is matched with the set value of the encapsulation method of the control unit 13. For this reason, the control unit 13 at the side of the facing station 10A (or 10B) does not change the encapsulation method (following operation is not performed) (operation S55). Then, the control unit 13 at the side of the facing station 10A (or 10B) resets the timer measurement and completes the process (operation S56).

As such, a time difference is set until the encapsulation method is changed, in accordance with the encapsulation method of the received SONET transmission frame. As a result, the encapsulation method can be standardized to the GFP having high transmission efficiency.

As described above, by matching the encapsulation method and the decapsulation method at the transmitting side and the receiving side using the communication control method according to this embodiment, the probability of decapsulation being performed can be increased. As a result, transmission efficiency of the communication network can be improved.

For example, since the network manager may not manage and set the encapsulation method and the decapsulation method at the transmitting side and the receiving side, a procedure until signal communication in the communication network can be simplified, and an operation load of the communication network can be alleviated.

(2. Modification)

In the transmitting apparatus 10, the control unit 13 commonly controls (changes) the encapsulation method in the encapsulating process unit 17 and the decapsulation method in the decapsulating unit 14. Meanwhile, in a transmitting apparatus 20 according to this modification, an encapsulation method in an encapsulating process unit 28 and a decapsulation method in a decapsulating unit 24 can be individually controlled.

Figure 10:
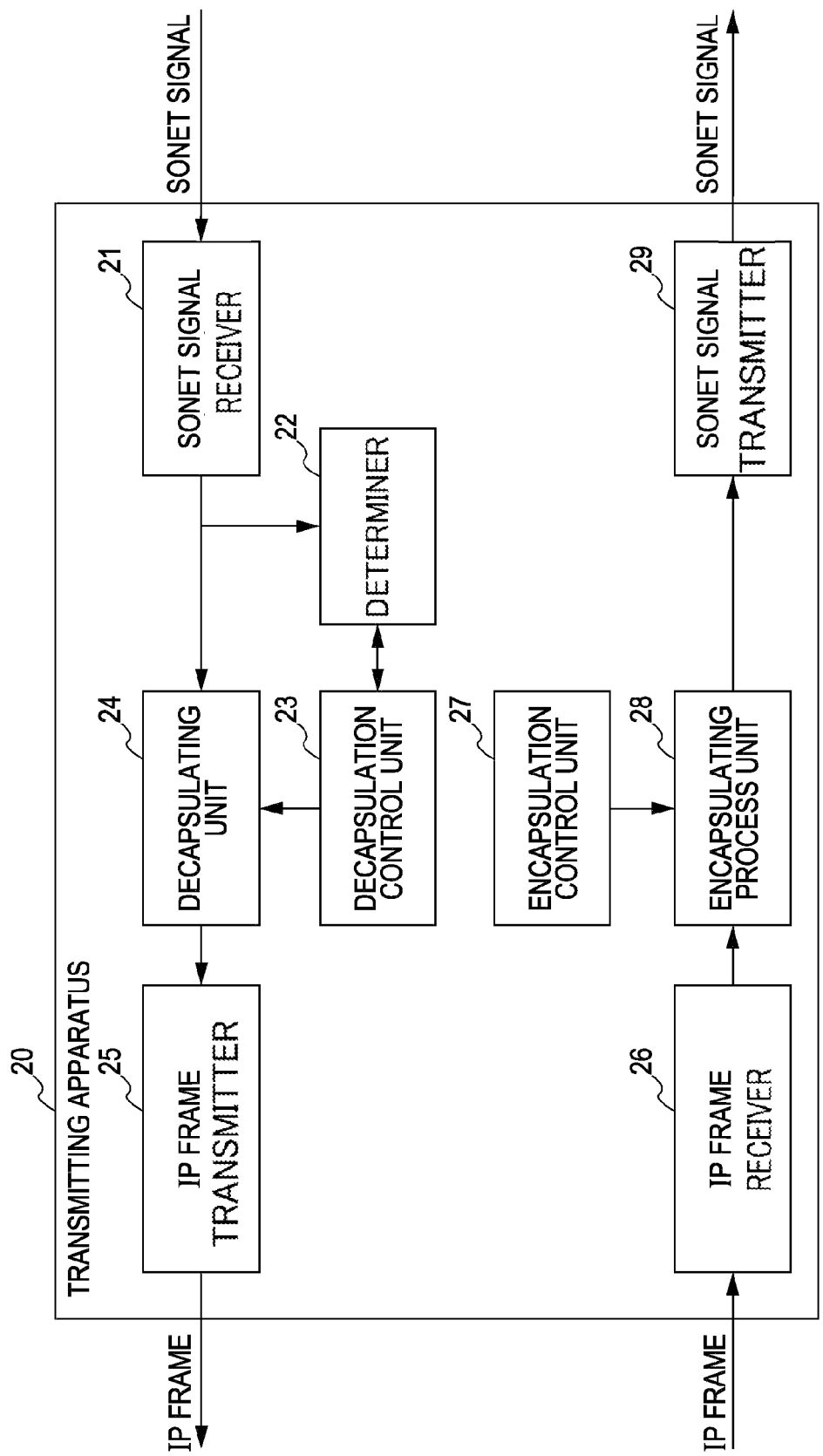
FIG. 10 is a block diagram illustrating an example of the configuration of a transmitting apparatus according to a modification.

FIG. 10 is a block diagram illustrating an example of the configuration of the transmitting apparatus 20 according to the modification. The transmitting apparatus 20 illustrated in FIG. 10 includes a SONET signal receiver 21, a determiner 22, a decapsulation control unit 23, a decapsulating unit 24, and an IP frame transmitter 25. The transmitting apparatus 20 further includes an IP frame receiver 26, an encapsulation control unit 27, an encapsulating process unit 28, and a SONET signal transmitter 29.

In this case, the SONET signal receiver 21, the determiner 22, the decapsulating unit 24, and the IP frame transmitter 25 have the same functions as those of the SONET signal receiver 11, the determiner 12, the decapsulating unit 14, and the IP frame transmitter 15. The IP frame receiver 26, the encapsulating process unit 28, and the SONET signal transmitter 29 have the same functions as those of the IP frame receiver 16, the encapsulating process unit 17, and the SONET signal transmitter 18.

The decapsulation control unit 23 controls the decapsulating unit 24, based on the determination result of the determiner 22. For example, when the determination result of the determiner 22 is different from the decapsulation method set by the decapsulation control unit 23, the decapsulation control unit 23 changes the decapsulation method of the decapsulating unit 24.

The encapsulation control unit 27 controls the encapsulating process unit 28, based on the encapsulation method previously set by the network manager. For example, when the PPP is set, the encapsulation control unit 27 can control the encapsulating process unit 28 to perform encapsulation using the PPP. Meanwhile, when the GFP is set, the encapsulation control unit 27 can control the encapsulating process unit 28 to perform encapsulation using the GFP.

Next, an example of the operation of the transmitting apparatus 20 will be described using FIG. 11.

Figure 11:
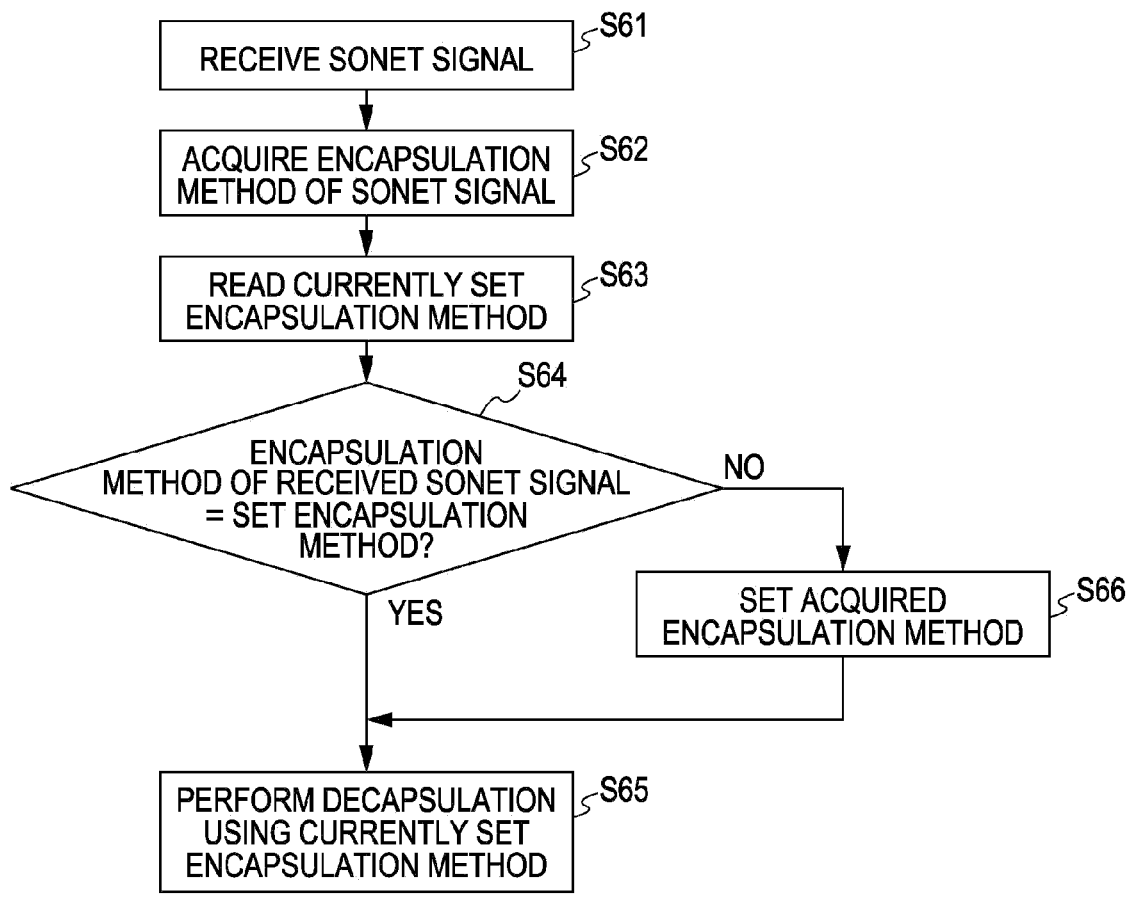
FIG. 11 is a flowchart illustrating an example of the operation of the transmitting apparatus illustrated in FIG. 10.

First, as exemplified in FIG. 11, the SONET signal receiver 21 receives the SONET transmission frame transmitted from the facing station (operation S61).

Then, the determiner 22 acquires (determines) the encapsulation method of the received data frame, based on the value of the C2 byte or the Z7 byte set to the SONET overhead of the SONET transmission frame (operation S62).

The decapsulation control unit 23 reads the decapsulation method that is currently used in the transmitting apparatus 20 (operation S63). Then, the decapsulation control unit 23 determines whether the decapsulation method read in operation S63 is matched with the encapsulation method acquired in operation S62 (operation S64).

When it is determined that the decapsulation method read in operation S63 is matched with the encapsulation method acquired in operation S62 (YES of operation S64), the decapsulation control unit 23 performs decapsulation according to the method that is currently used (operation S65). That is, since this case corresponds to the case where the encapsulation methods are matched in the own station 20 and the facing side (facing station), the encapsulation method may not be changed.

Meanwhile, when it is determined that the decapsulation method read in operation S63 is mismatched with the encapsulation method acquired in operation S62 (NO of operation S64), the decapsulation control unit 23 changes the decapsulation method. That is, since this case corresponds to the case where the encapsulation methods are mismatched in the own station 20 and the facing side (facing station), the decapsulation method is changed (set) to the encapsulation method acquired in operation S62 (operation S66).

Then, the decapsulating unit 24 decapsulates the received SONET transmission frame using the encapsulation method changed in operation S66 (operation S65).

As described above, the transmitting apparatus 20 according to this embodiment can individually control the decapsulation method and the encapsulation method, and can flexibly control the decapsulating process and the encapsulating process of the transmitting apparatus 20. For example, the encapsulating process unit 28 performs an encapsulating process based on the GFP, and the decapsulating unit 24 can flexibly change the decapsulation method according to the encapsulation method of the received SONET transmission frame. Further, the encapsulation methods of the communication network can be easily standardized to one encapsulation method.

(3. Others)

The individual configurations and processes of the transmitting apparatuses 10 and 20 described above may be appropriately selected and removed or appropriately combined, if necessary.

Further, at least one of the ingress node 10A and the egress node 10B may have the configuration and process of any one of the transmitting apparatuses 10 and 20.

In the above example, the network that is fixed between the transmitting apparatuses 10 and 20 is the GMPLS network, but the present invention is not limited thereto. For example, the network may be a Multi Protocol Label Switch (MPLS) network.

Further, in the above example, the PPP or GFP is used as the encapsulation method, but another encapsulation method may be used. For example, an Internet encapsulation protocol, a Generic Routing Encapsulation (GRE) technique, an IPinIP tunneling technique, and encapsulation based on High-level Data Link Control (HDLC) may be used. In this case, information used to identify an encapsulation method may be included in a transmitted data frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A communication control method of a transmission system that exchanges a transmission frame between a first transmitting apparatus and a second transmitting apparatus, the communication control method comprising:
    causing the first transmitting apparatus to receive a transmission frame, which is encapsulated using a first method or a second method different from the first method, from the second transmitting apparatus;
    causing the first transmitting apparatus to determine an encapsulation method of the transmission frame, based on information set according to the encapsulation method in the received transmission frame;
    causing the first transmitting apparatus to decapsulate the received transmission frame, based on the determination result; and
    causing the first transmitting apparatus to encapsulate another transmission frame using the determined encapsulation method and transmit another transmission frame,
    wherein another transmission frame is a transmission frame to be transmitted to the second transmitting apparatus, and
    wherein the encapsulation of the transmission frame to be transmitted to the second transmitting apparatus is performed after a passage of time according to the determined method from the determination.

2. The communication control method of claim 1,
    wherein the information is set to a path overhead of the transmission frame.

3. The communication control method of claim 1,
    wherein time according to the first method is longer than time according to the second method.

4. The communication control method of claim 1,
    wherein the first method is a Point to Point Protocol (PPP), and
    the second method is a Generic Framing Procedure (GFP).

5. A transmitting apparatus that exchanges a transmission frame with another transmitting apparatus, the transmitting apparatus comprising:
    a receiver configured to receive a transmission frame, which is encapsulated using a first method or a second method different from the first method, from the another transmitting apparatus;
    a determiner configured to determine an encapsulation method of the transmission frame received by the receiver, based on information set according to the encapsulation method in the received transmission frame;
    a decapsulating unit configured to decapsulate the transmission frame received by the receiver, based on the determination result of the determiner; and
    a transmitter configured to encapsulate another transmission frame using the encapsulation method determined by the determiner and transmit another transmission frame,
    wherein another transmission frame is a transmission frame to be transmitted to the another transmitting apparatus, and
    wherein the encapsulation of the transmission frame to be transmitted to the another transmitting apparatus is performed after a passage of time according to the determined method from the determination of the determiner.

6. The transmitting apparatus of claim 5,
    wherein the information is set to a path overhead of the transmission frame.

7. The transmitting apparatus of claim 5,
wherein time according to the first method is longer than time according to the second method.

8. The transmitting apparatus of claim 5,
wherein the first method is a Point to Point Protocol (PPP), and
the second method is a Generic Framing Procedure (GFP).

* * * * *